May 25, 1965  E. LOCH  3,185,532
BEARING BUSH SUSPENSION
Filed Dec. 20, 1962
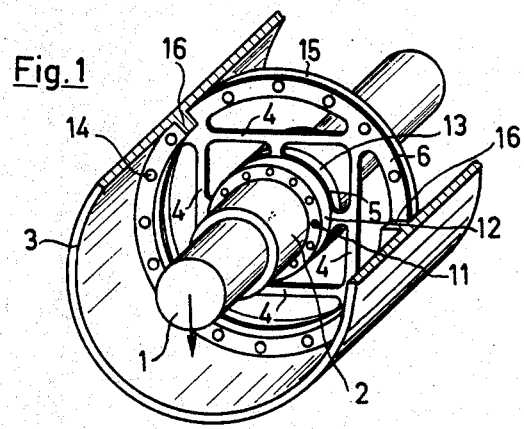
Fig. 1
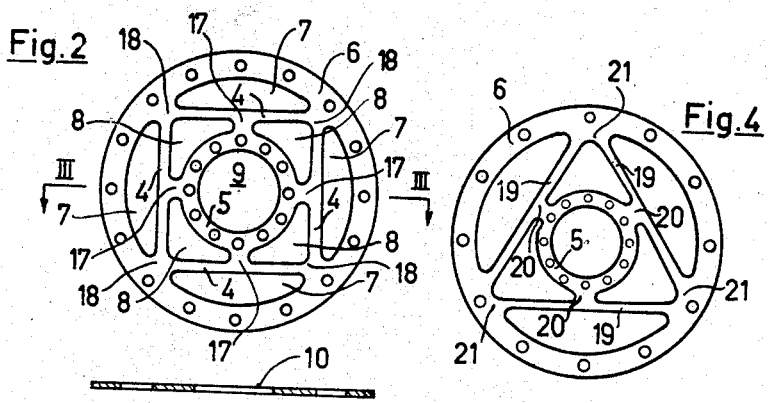
Fig. 2
Fig. 4
Fig. 3

United States Patent Office 3,185,532
Patented May 25, 1965

3,185,532
BEARING BUSH SUSPENSION
Erwin Loch, Zurich, Switzerland, assignor to Escher Wyss Aktiengesellschaft, Zurich, Switzerland, a corporation of Switzerland
Filed Dec. 20, 1962, Ser. No. 246,077
Claims priority, application Switzerland, Jan. 17, 1962, 562/62
5 Claims. (Cl. 308—15)

This invention relates to a device for the flexible suspension of the bearing bush of a radial bearing, more particularly a gas-lubricated radial bearing.

As a rule, gas-lubricated bearings operate with a very small bearing clearance. It is therefore important that the bearing bush, on bending of the shaft mounted therein, should adapt itself to the inclination of the shaft axis so as to avoid metallic contact between bush and shaft. The suspension of the bearing bush must be resilient in the sense that it should offer only slight resistance to a variation in inclination of the bearing bush, but should ensure a central position of the bearing bush.

A known device for the suspension of a radial bearing has for this purpose an annular metal diaphragm clamped by the outer periphery in the supporting member of the bearing, the bearing bush being secured to the inner wall of said diaphragm. This diaphragm suspension is capable of satisfying the above-mentioned conditions to a certain degree; it has, however, certain disadvantages.

Experience has shown that the diaphragm cannot in practice be made such that when its inner edge is clamped to the bearing bush, deformation properties which are uniform in all directions are obtained. The material is not homogeneous and stress-free. Buckling of the diaphragm may occur with abrupt springing into another deformation condition, accompanied by the production of noise. In service, the diaphragm also vibrates at a high frequency in a wide speed range. In addition, when the bearing bush becomes heated by bearing friction, the diaphragm is subjected to a radial compressive stress. The diaphragm may then buckle and shift the bearing bush in the axial direction.

It is the aim of the invention to obviate these disadvantages. In a device for the flexible suspension of the bearing bush of a radial bearing, more particularly a gas-lubricated radial bearing, this aim is achieved according to the invention in that the bearing bush is connected to a supporting member, surrounding the bearing bush, by at least three flexible cross-pieces extending at equal distances from the bearing axis in a plane perpendicular to the latter, and distributed uniformly on the outer periphery of the bearing bush.

Preferably, the cross-pieces are connected to the supporting member at their two ends, and to the bearing bush at a point intermediate between the two ends.

A constructional example of the subject of the invention is illustrated in the drawing, wherein:

FIG. 1 shows an oblique view of the device,
FIG. 2 shows the part of the device shown in FIG. 1 provided with the cross-pieces,
FIG. 3 is a section on the line III—III of FIG. 2,
FIG. 4 shows a modification of the form and arrangement of the cross-pieces.

According to FIG. 1, a shaft is journalled in a bearing bush 2. The bearing bush 2 is suspended in a fixed supporting member 3 radially spaced from the bearing bush and surrounding it. In a plane perpendicular to the bearing axis, four flexible cross-pieces 4 are arranged at the same distance from the bearing axis and uniformly distibuted on the outer periphery of the bearing bush. These cross-pieces connect the bearing bush 2 to the supporting member 3.

As follows from FIGS. 2 and 3, the cross-pieces 4 together with an inner ring 5 to be connected to the bearing bush 2 and an outer ring 6 to be connected to the supporting element 3 consist of a single annular flexible metal plate provided with suitable cut-outs 7, 8, 9.

As shown by FIG. 1, the inner ring 5 is clamped by screws 11 between a flange 12 of the bearing bush 2 and a counter-ring 13. Screws 14 serve for fixing the outer ring, which screws press the ring 6 against an inner flange 16 by means of a counter-ring 15.

According to FIGS. 1 and 2, the four cross-pieces 4 together form a square. Two sides of this square are in the main loading direction, here assumed to be vertical. The centres 17 of the sides of this square are rigidly connected to the bearing bush 2 by means of the inner ring 5, and the corners 18 of the square are rigidly connected to the supporting member 3 by means of the outer ring 6.

In the device described, the flexibility in respect of angular variations in the position of the bearing bush is better than in the known suspension by means of an annular diaphragm. The cross-pieces 4 formed by means of the cut-outs 7, 8 in the plate 10, now have also a certain flexibility in the radial direction. In the case of expansion of the bearing bush 2 and the inner ring 5 due to heating, the cross-pieces 4 are subjected to a bending stress only, and imposed stresses of harmful magnitude are avoided. The central position of the bearing bush is nevertheless always ensured, since forces directed transversely of the axis stress the cross-pieces 4 only for tension or compression, no deformation of practical significance occuring.

A similar effect may also be obtained even with the provision of three cross-pieces. In the embodiment shown in FIG. 4, three cross-pieces 19, together forming an equilateral triangle, are provided for the suspension of the bearing bush. The centres 20 of the sides of this triangle are rigidly connected to the inner ring 5 to be fixed to the bearing bush 2, and the corners 21 of the triangle are rigidly connected to the outer ring 6 to be fixed to the supporting member 3. The parts 5, 6, 19 again consist of a single metal plate provided with suitable cut-outs.

Instead of only three or four cross-pieces, however, more than four may also be provided, which advantageously form a regular polygon. The greater the number of cross-pieces, however, the shorter will be the individual cross-pieces and the greater will also be their stiffness to bending. With a view to ensuring flexibility in the radial direction, therefore, the number of cross-pieces will not be made too large.

What is claimed is:
1. A radial bearing comprising
   (a) a bearing bush;
   (b) a fixed supporting member surrounding said bush and radially spaced therefrom;
   (c) at least three flat, rectilinear, flexible, metal strips lying with their major transverse dimension in a plane perpendicular to the axis of the bush and equally spaced therefrom;
   (d) each strip fixedly connected at its opposite ends to said member and at a point intermediate its ends with the bush, the intermediate points being distributed around the periphery of the bush.
2. The combination defined in claim 1 in which said strips form a regular polygon and each intermediate point of connection is at the center of the strip.
3. The combination defined in claim 2 in which the polygon is a triangle.
4. The combination defined in claim 2 in which the polygon is a square, the square having two sides arranged parallel with the main loading direction of the bearing.
5. A radial bearing comprising

(a) a bearing bush;
(b) a fixed supporting member encircling the bush and radially spaced therefrom;
(c) a skeletal, one-piece, supporting diaphragm lying in a plane perpendicular to the axis of the bush and comprising an outer annular rim secured to the member and an inner annular rim secured to said bush and equal length, rectilinear strips extending between different spaced points on the outer rim and each connected at a point intermediate its end with the inner rim.

References Cited by the Examiner
UNITED STATES PATENTS

| | | | |
|---|---|---|---|
| 742,178 | 2/00 | Fleming et al. | 308—147 |
| 887,938 | 3/07 | Hartmann | 308—147 |
| 1,679,890 | 8/28 | Baldwin | 308—26 |
| 2,874,008 | 2/59 | Orte et al. | 308—184 |

FOREIGN PATENTS

| | | |
|---|---|---|
| 19,354 | 4/29 | Australia. |
| 405,203 | 12/09 | France. |
| 1,011,067 | 6/52 | France. |
| 631,157 | 12/47 | Great Britain. |
| 749,341 | 5/56 | Great Britain. |
| 824,185 | 11/59 | Great Britain. |

ROBERT C. RIORDON, *Primary Examiner.*

FRANK SUSKO, *Examiner.*